United States Patent
McCloskey et al.

(10) Patent No.: US 10,852,981 B2
(45) Date of Patent: Dec. 1, 2020

(54) SYSTEM FOR MIGRATING VIRTUAL TAPE VOLUMES BETWEEN FILESYSTEMS

(71) Applicant: EMC IP HOLDING COMPANY LLC, Hopkinton, MA (US)

(72) Inventors: Larry W McCloskey, Hamilton, MT (US); John P Darling, McKinney, TX (US); Douglas R Phillips, Webster, MA (US); Innokentiy Aristov, Saint Petersburg (RU)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 207 days.

(21) Appl. No.: 15/971,502

(22) Filed: May 4, 2018

(65) Prior Publication Data
US 2019/0339896 A1 Nov. 7, 2019

(51) Int. Cl.
*G06F 3/06* (2006.01)
(52) U.S. Cl.
CPC .......... *G06F 3/0647* (2013.01); *G06F 3/0604* (2013.01); *G06F 3/0664* (2013.01); *G06F 3/0682* (2013.01)

(58) Field of Classification Search
CPC .... G06F 3/0647; G06F 3/0604; G06F 3/0664; G06F 3/0682
See application file for complete search history.

(56) References Cited

U.S. PATENT DOCUMENTS

| | | | |
|---|---|---|---|
| 2004/0143609 A1* | 7/2004 | Gardner | G06F 16/10 |
| 2006/0101084 A1* | 5/2006 | Kishi | G06F 3/0608 |
| 2010/0077168 A1* | 3/2010 | Arakawa | G06F 12/0223 711/165 |
| 2010/0217612 A1* | 8/2010 | Apacible | G06F 16/22 705/1.1 |
| 2016/0117267 A1* | 4/2016 | Witt | G06F 21/6218 711/111 |

* cited by examiner

*Primary Examiner* — Eric Cardwell
(74) *Attorney, Agent, or Firm* — Anderson Gorecki LLP

(57) ABSTRACT

A virtual tape engine migrates a virtual tape volume between filesystems. A source virtual tape volume is copied into the virtual tape engine, and a target virtual tape volume is generated. Data associated with the source virtual tape volume may be modified to generate the target virtual tape volume. For example, compression or encryption state may be modified. Migration may be triggered automatically in accordance with a migration policy. The source virtual tape volume remains accessible during migration.

20 Claims, 5 Drawing Sheets

DLm0409I: Command received: 'query migrate'
Migration is licensed on this VTE
Migration is currently enabled on the VTE
3 Migration policies configured:
\-\-\-\-\-\-\-\-\-\-\-\-\-\-\-\-\-\-\-\-\-\-\-\-\-\-\-\-\-\-\-\-\-\-\-\-\-\-\-\-\-
Migration Policy 'FSX-AllDays-vte1': VTE 1 ←——— 400
NOT CONFIGURED FOR USE ON THIS VTE
  From: '/tapelibPROD/FSX' ←——— 404
  To:   '/tapelibPROD/FSA' ←——— 406
  Move after: 7 days
  Tape modification: Compressed
  Move:
    on Sun-Sat all day,
  Maximum of 5 simultaneous migration tasks
  Last Scan: NA, Last Migration Started: NA
\-\-\-\-\-\-\-\-\-\-\-\-\-\-\-\-\-\-\-\-\-\-\-\-\-\-\-\-\-\-\-\-\-\-\-\-\-\-\-\-\-
Migration Policy 'FSY-AllDays-vte2': VTE 2
  Currently ENABLED on this VTE ←——— 402
  From: '/tapelibPROD/FSY'
  To:   '/tapelibPROD/FSB'
  Move after: 7 days ←——— 408
  Tape modification: Compressed ←——— 412
  Move:
    on Sun-Sat all day, ←——— 410
  Maximum of 5 simultaneous migration tasks
  Last Scan: 10/30/2017 16:37:45 EDT, Last Migration Started: 10/23/2017 06:50:21 EDT,
\-\-\-\-\-\-\-\-\-\-\-\-\-\-\-\-\-\-\-\-\-\-\-\-\-\-\-\-\-\-\-\-\-\-\-\-\-\-\-\-\-
Migration Policy 'FSZ-AllDays-vte2': VTE 2
  Currently NOT ENABLED on this VTE
  From: '/tapelibPROD/FSZ'
  To:   '/tapelibPROD/FSC'
  Move after: 7 days
  Tape modification: Compressed
  Move:
    on Sun-Sat all day,
  Maximum of 5 simultaneous migration tasks ←——— 414
  Last Scan: NA, Last Migration Started: NA
\-\-\-\-\-\-\-\-\-\-\-\-\-\-\-\-\-\-\-\-\-\-\-\-\-\-\-\-\-\-\-\-\-\-\-\-\-\-\-\-\-

Figure 4

SYSTEM FOR MIGRATING VIRTUAL TAPE VOLUMES BETWEEN FILESYSTEMS

TECHNICAL FIELD

The present disclosure is generally related to data storage, and more particularly to virtual tape volumes.

BACKGROUND

A tape drive is a data storage appliance that reads and writes data stored on magnetic tape. Tape drives were at one time commonly used with mainframe computers for data storage because magnetic tape had the advantages of relatively low cost per bit of storage capacity and better stability than HDDs (Hard Disk drives). However, tape drives have greater IO (input-output) latency than HDDs because magnetic tape is sequentially accessed, and magnetic tapes sometimes must be manually retrieved from storage and mounted in a tape drive to be accessed. Consequently, magnetic tape was typically used for archival purposes, whereas active data was maintained on HDDs.

Many real tape drives have now been replaced by virtual tape drives. A virtual tape drive is a specialized appliance that uses non-tape storage media to store data that is presented to the mainframe computer as though it were stored on tape. From the perspective of the mainframe computer, the virtual tape drive responds to the same commands as a real tape drive. However, HDDs such as SAS or SATA disk arrays may be used to store a virtual tape library of virtual tape volumes rather than a physical library of magnetic tapes. Because HDDs have better IO performance than magnetic tape, virtual tape drives provide improved IO performance. Further, virtual tape drives typically support legacy tape drive backup and recovery processes and policies, thereby providing the advantages of faster data backup and restoration.

SUMMARY

All examples, aspects and features mentioned in this document can be combined in any technically possible way.

In accordance with an aspect an apparatus comprises: a virtual tape engine comprising: a plurality of compute nodes each comprising non-transitory memory and at least one processor; a mainframe host computer interface adapted to receive tape drive utility access commands from a mainframe host computer; a storage array interface adapted to send input-output commands to a storage array and receive data from the storage array; and a migration engine that: sends input-output commands to the storage array to read a copy of a source virtual tape volume, wherein the source virtual tape volume is associated with a source filesystem; and sends input-output commands to the storage array to write a copy of a target virtual tape volume corresponding to the source virtual tape volume, wherein the target virtual tape volume is associated with a target filesystem. In some implementations the migration engine modifies a data set associated with the source virtual tape volume to generate the target virtual tape volume. In some implementations the migration engine modifies the data set by changing compression state. In some implementations the migration engine modifies the data set by changing encryption state. In some implementations the source virtual tape volume is in a source directory, and the migration engine locks virtual tape volume serial numbers in the source directory. In some implementations the target virtual tape volume is in a target directory, and the migration engine locks virtual tape volume serial numbers in the target directory. In some implementations the migration engine sends input-output commands to the storage array to delete the source virtual tape volume. Some implementations comprise a migration policy that defines at least one of the following attributes: a source directory from which virtual tape volumes will be migrated; a target directory to which virtual tape volumes will be migrated; a move after field that indicates an age at which virtual tape volumes become eligible to be migrated; a field indicating when migration should and/or should not be performed; a tape modification field that indicates how a data set of the virtual tape volume is to be modified; and a max tasks field that indicates a maximum number of virtual tape volumes that will be concurrently migrated. In some implementations the migration engine automatically triggers migration of the source virtual tape volume based on the migration policy. In some implementations the virtual tape engine provides the mainframe host computer with access to the source virtual tape volume during migration.

In accordance with an aspect a method comprises: with a virtual tape engine comprising a plurality of compute nodes each comprising non-transitory memory and at least one processor, a mainframe host computer interface adapted to receive tape drive utility access commands from a mainframe host computer, a storage array interface adapted to send input-output commands to a storage array and receive data from the storage array, and a migration engine: sending input-output commands to the storage array to read a copy of a source virtual tape volume, wherein the source virtual tape volume is associated with a source filesystem; and sending input-output commands to the storage array to write a copy of a target virtual tape volume corresponding to the source virtual tape volume, wherein the target virtual tape volume is associated with a target filesystem. Some implementations comprise the migration engine modifying a data set associated with the source virtual tape volume to generate the target virtual tape volume. Some implementations comprise the migration engine modifying the data set by changing compression state. Some implementations comprise the migration engine modifying the data set by changing encryption state. Some implementations, wherein the source virtual tape volume is in a source directory, comprise the migration engine locking virtual tape volume serial numbers in the source directory. Some implementations, wherein the target virtual tape volume is in a target directory, comprise the migration engine locking virtual tape volume serial numbers in the target directory. Some implementations comprise the migration engine sending input-output commands to the storage array to delete the source virtual tape volume. Some implementations comprise generating a migration policy that defines at least one of the following attributes: a source directory from which virtual tape volumes will be migrated; a target directory to which virtual tape volumes will be migrated; a move after field that indicates an age at which virtual tape volumes become eligible to be migrated; a field indicating when migration should and/or should not be performed; a tape modification field that indicates how a data set of the virtual tape volume is to be modified; and a max tasks field that indicates a maximum number of virtual tape volumes that will be concurrently migrated. Some implementations comprise the migration engine automatically triggering migration of the source virtual tape volume based on the migration policy. Some implementations comprise the virtual tape engine providing the mainframe host computer with access to the source virtual tape volume during migration.

BRIEF DESCRIPTION OF THE FIGURES

FIG. 4 illustrates several exemplary migration policies.

DETAILED DESCRIPTION

Some aspects, features, embodiments, and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, device, or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that simulate, emulate, or abstract other features. The term "physical" is used to refer to tangible features. For example, and without limitation, multiple virtual computing devices could operate simultaneously on one physical computing device. The term "logic" is used to refer to special purpose physical circuit elements and software instructions that are stored on a non-transitory computer-readable medium and implemented by multi-purpose tangible processors.

Figure 1:
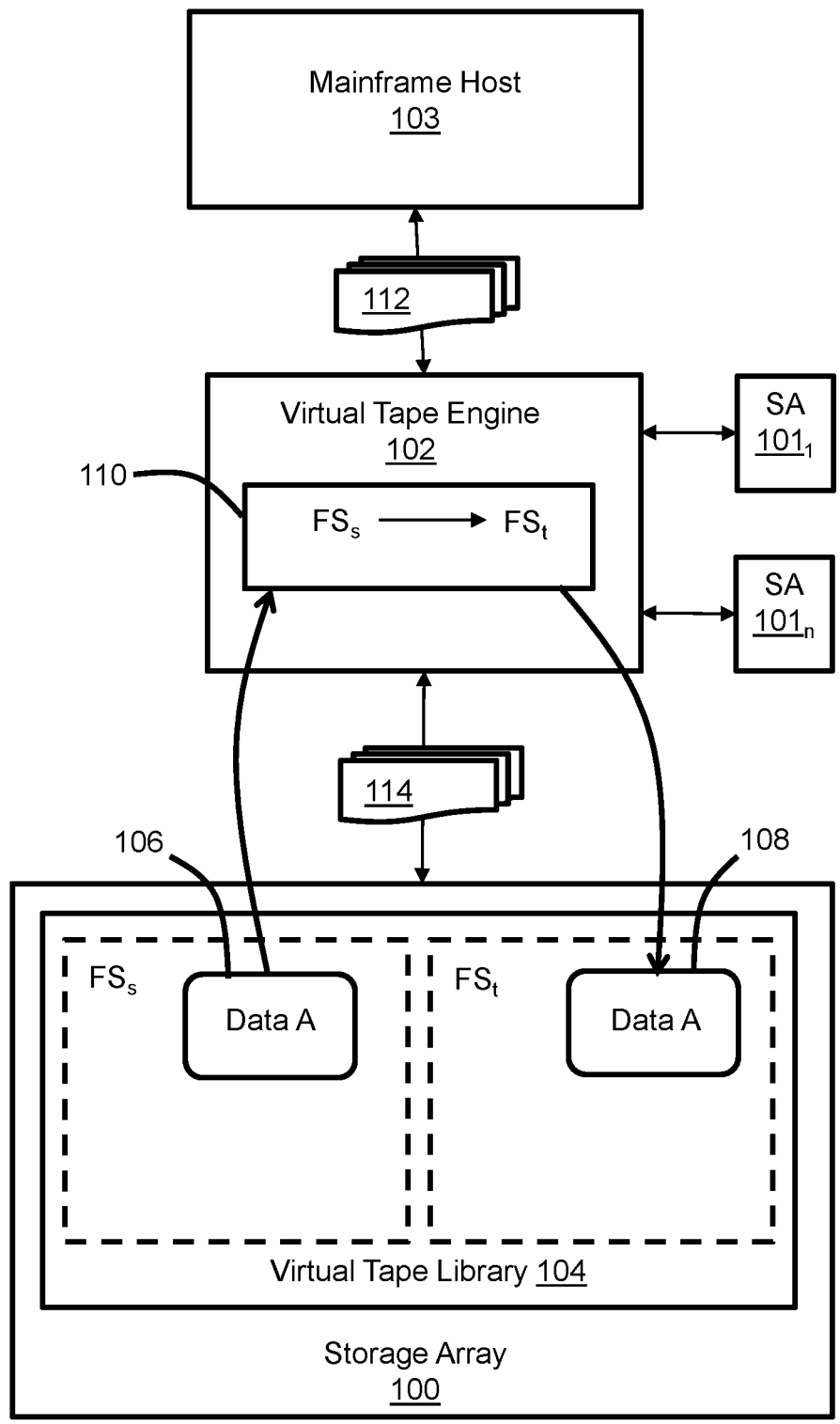
FIG. 1 illustrates use of a virtual tape engine to migrate a virtual tape volume between filesystems.

FIG. 1 is a block diagram that illustrates use of a virtual tape engine to migrate a virtual tape volume between different filesystems. In the illustrated example, virtual tape engine 102 is connected between a mainframe host computer 103 and a storage array 100. The mainframe host computer 103 includes tangible processor, memory, and storage resources, as is generally understood in the art, and will typically be connected to a network. The virtual tape engine simulates a real tape backup engine. The virtual tape engine 102 is responsive to tape drive utility access commands 112, such as tape read and tape write, that are sent by the mainframe host computer 103 to prompt IO operations. The virtual tape engine 102 is responsive to the access commands 112 from the mainframe host computer to generate corresponding IOs 114 to prompt corresponding IO operations by the storage array 100. IOs 114 from the virtual tape engine may identify virtual tape volume data based on, for example and without limitation, filenames, logical block addresses, or some other metadata. Thus, the virtual tape engine translates between tape drive utility access commands and an IO format to which the storage array is responsive in order to use the storage resources of the storage array 100 to maintain a virtual tape library 104 in which virtualized tape data is stored.

Each virtual tape volume in the virtual tape library 104 includes a data set and an associated filesystem. In the illustrated example the virtual tape library includes a virtual tape volume 106 that includes a data set "A" and filesystem "FSs" that is the source filesystem in the migration process. The filesystem is a data structure that describes how the data set of the associated virtual tape volume is stored. For example, and without limitation, the filesystem may describe a directory structure with specific files located in specific directories, various information describing attributes of individual directories and files including but not limited to create and modification timestamps, and logical block addresses of the data set, among a variety of things. Virtual tape filesystems may support technologies such as NFS (Network File System) and MPFS (Multi-Protocol File System), and protocols such as FTP (File Transfer Protocol), NDMP (Network Data Management Protocol), TFTP (Trivial File Transfer Protocol), SMB (Server Message Block), and MPFS, for example, and without limitation.

For a variety of reasons, it may be desirable to migrate a virtual tape volume between different filesystems. A brute force technique for migrating a virtual tape volume from a source filesystem to a target filesystem is to copy the virtual tape volume into the mainframe host computer 103 and write the data back into the storage array 100 through the virtual tape engine 102. The target virtual tape volume would be generated as the data is written back into the storage array. However, the brute force technique has the disadvantage of using a potentially significant amount of costly mainframe processing and memory resources, and may take considerable time. Further complicating matters, the data associated with the source filesystem may be incompatible with, or non-optimized for, the target filesystem.

Aspects of the present disclosure include a technique using the virtual tape engine 102 to migrate virtual tape volumes between different filesystems. In the illustrated example, source virtual tape volume 106 is migrated from a source filesystem FSs to a target filesystem FSt, yielding target virtual tape volume 108. The migration may be implemented automatically, without using mainframe host computer resources, and with little or no interruption of normal operations, e.g. virtual tape volume 106 may remain accessible to the mainframe host computer. During migration, a copy of the source virtual tape volume 106 is processed by a migration engine 110 to copy the virtual tape volume to the target filesystem FSt. If data set "A" of virtual tape volume 106 is not modified then the target virtual tape volume 108 may contain an exact copy of the data set of the source virtual tape volume, i.e. data set A, but now described by filesystem FSt. Although the migration is shown as being between filesystems of a virtual tape library on storage array 100, there may be other storage arrays $101_1$ through $101_n$, and migration may occur between storage arrays.

In some circumstances it may be desirable to modify the form of the source data set. For example, it may be desirable to generate characteristic data set attributes that are compatible with, or optimized for, the target filesystem. Characteristic attributes may also be selected based on the storage system associated with the target filesystem. Examples of characteristic attributes that may be changed include, but are not limited to, encryption, compression, and deduplication. For example, a virtual tape volume that is stored in compressed form on a first type of storage system may be uncompressed if it is being migrated to a second type of storage system that employs deduplication, or encrypted if it is being migrated to a third type of storage system such as cloud storage. In such instances a copy of the source virtual tape volume 106 is processed by the migration engine 110 during migration to generate a modified data set. For example, if the source data set A is modified then a target virtual tape volume may be generated that contains the same data in a different form.

Figure 2A:
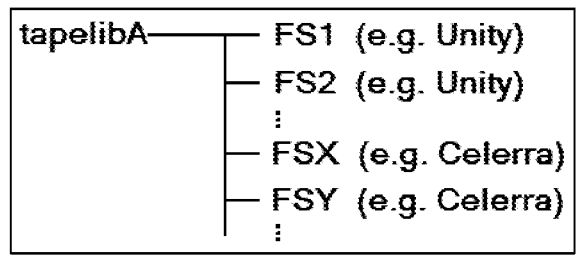
FIG. 2A illustrates a legacy (source) filesystem mounted in the same virtual tape library as the target filesystem to which its contents will be migrating.

Referring to FIG. 2A, a legacy (source) filesystem may be mounted in the same virtual tape library as the target filesystem to which its contents will be migrating. In the illustrated example, virtual tape volumes in a virtual tape library tapelibA are migrated from the Unity filesystem to the Celerra filesystem. The legacy filesystems are mounted in read-write mode on the virtual tape engine, and each old virtual tape file is removed from the old filesystem after it is migrated to the new filesystem so that duplicate VOLSERs (virtual tape volume serial numbers) do not exist on the virtual tape engine. Any number of legacy filesystems may be mounted in a virtual tape library along with newer filesystems. This allows any virtual tape drive assigned to that virtual tape library to access both old and new virtual tape volumes concurrently, and all virtual tape volumes will be accessible to that virtual tape library's virtual tape drives both before and after migration.

Figure 2B:
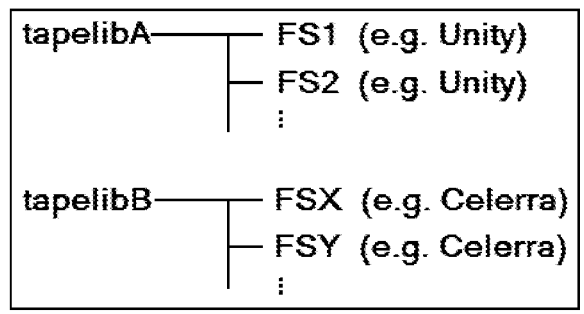
FIG. 2B illustrates a legacy (source) filesystem mounted in a different virtual tape library than the target filesystem to which its contents will be migrating.

As shown in FIG. 2B, the source and target virtual tape volumes may be located in different virtual tape libraries. In the illustrated example, virtual tape volumes are migrated from the Unity filesystem in a virtual tape library tapelibA to the Celerra filesystem in a virtual tape library tapelibB. This configuration keeps the legacy filesystems' virtual tape volumes separated from the target filesystems.

Figure 3:
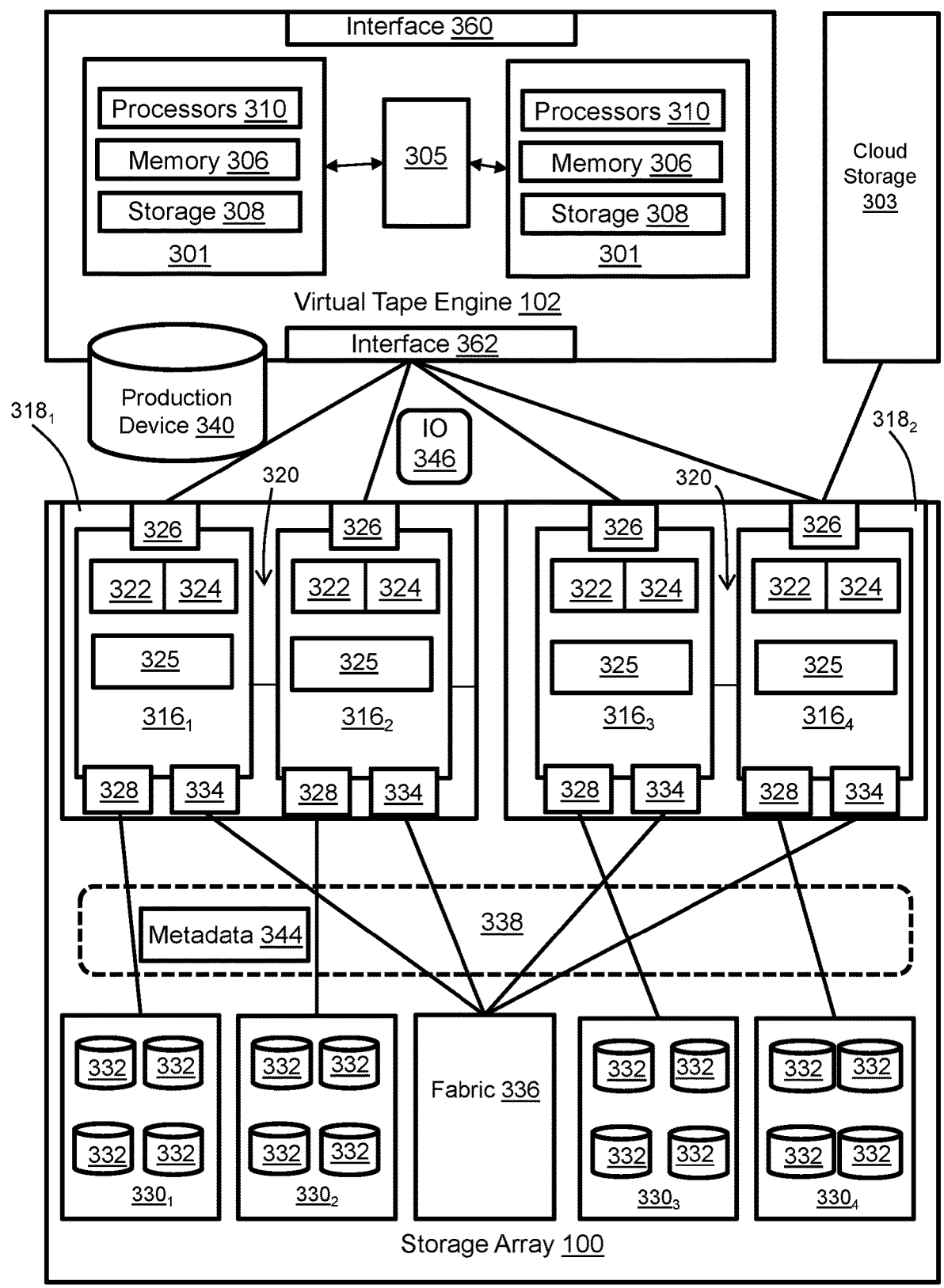
FIG. 3 illustrates the virtual tape engine and storage array in greater detail.

Referring now to FIG. 3, the virtual tape engine 102 may include a plurality of compute nodes 301, each having volatile memory 306, persistent storage 308, and one or more tangible processors 310. The volatile memory 306 may include RAM (Random Access Memory) of any type. The persistent storage 308 may include tangible persistent storage components of one or more technology types, for example and without limitation SCM (storage class memory), SSDs such as flash, and HDDs such as SATA (Serial Advanced Technology Attachment) and FC (Fibre Channel). The compute nodes 301 are interconnected via a switch fabric 305. Interface 360 is adapted to communicate with the mainframe host computer. Interface 362 is adapted to communicate with the storage array.

The storage array 100 includes a plurality of compute nodes $316_1$-$316_4$ that may include one or more of "vanilla" storage servers, specialized computers, subsystems and other hardware possibly but not necessarily including storage directors. Pairs of the compute nodes, e.g. ($316_1$, $316_2$) and ($316_3$, $316_4$), may be organized as storage engines $318_1$, $318_2$, respectively, for purposes of failover between compute nodes. The paired compute nodes of each storage engine may be directly interconnected by communication links 320. Each compute node may include at least one tangible multi-core CPU (central processing unit) type processor 322, at least one GPGPU (general purpose graphics processing unit) type processor 324, and a local volatile memory 325. The local volatile memory 325 may include, for example and without limitation, components such as RAM of any type. Each compute node may also include one or more FEs 326 (front-end adapters) for communicating with the virtual tape engine 102 and cloud storage 303. Each compute node $316_1$-$16_4$ may also include one or more BEs 328 (back end adapters) for communicating with respective associated drive arrays $330_1$-$330_4$, thereby enabling access to managed drives 332. The managed drives 332 may include tangible persistent storage components of one or more technology types, for example and without limitation SCM (storage class memory), SSDs such as flash, and HDDs such as SATA and FC. Each compute node may also include one or more CAs (channel adapters) 334 for communicating with other compute nodes via an interconnecting fabric 336. Each compute node may allocate a portion or partition of its respective local volatile memory 325 to a virtual shared "global" memory 338 that can be accessed by other compute nodes, e.g. via DMA (direct memory access) or RDMA (remote direct memory access).

The storage array 100 maintains data associated with the virtual tape volumes of the virtual tape library managed by the virtual tape engine 102. The compute nodes 301 write virtual tape volume data to the storage array and read virtual tape volume data from the storage array in response to commands from the mainframe host computer and in order to perform various functions. A production device 340 may be created as a logical volume of storage for the virtual tape libraries. Without limitation, the production device 340 may be referred to as a production device, production volume, production LUN or host LUN, where LUN (Logical Unit Number) is a number used to identify the logical storage volume in accordance with the SCSI (Small Computer System Interface) protocol. The production device is an abstraction layer between the managed drives 332 and the compute nodes 301. From the perspective of the compute nodes 301, the production device 340 is a single data storage device having a set of contiguous fixed-size LBAs (logical block addresses) on which data used by the host application resides. However, the data used by the compute nodes 301 may actually be maintained by the storage array compute nodes $316_1$-$316_4$ at non-contiguous addresses on various different managed drives 332.

To service IOs from the virtual tape engine 102, the storage array 100 maintains metadata 344 that indicates, among various things, mappings between production device 340 storage space and the locations of extents of host application data in global memory 338 and on the managed drives 332. In response to an IO 346 from a compute node 301, the storage array uses the metadata 144 to find the requested virtual tape volume data in the shared global memory 338 or managed drives 332. More particularly, if the requested data is not in the shared global memory 338 then the requested data is temporarily copied into the shared global memory from the managed drives 332. The copy of the requested data in the shared global memory is used to satisfy the IO, i.e. reply to the virtual tape engine via one of the storage array compute nodes. In the case of a write IO the storage array copies the data into shared global memory, marks the corresponding production device location as dirty, and creates new metadata that maps the production device address with a location to which the data is eventually written on the managed drives. The shared global memory may enable the production device to be reachable via all the compute nodes and paths, although the storage array can be configured to limit use of certain paths to certain production devices.

FIG. 4 illustrates several exemplary migration policies with which the migration engine 110 (FIG. 1) may be configured. Each migration policy may include a descriptive name 400. A policy enable field 402 allows a specific policy to be toggled between enabled and not enabled (disabled). If configured as disabled, the policy can be enabled at any time with a MIGRATE ENABLE command, e.g. via a console associated with the virtual tape engine. A source directory field 404 specifies the tape library directories from which virtual tape volumes will be migrated. A target directory field 406 specifies the tape library directories to which virtual tape volumes will be migrated. A move after field 408 specifies the age at which virtual tape volumes under the migration policy will be eligible to be migrated. Age may be expressed relative to last-access of any kind or a specified number of days since the virtual tape volume was unmounted by the virtual tape engine. A move/do not move during field 410 specifies when migration should and/or should not be performed, where "when" may be expressed as time periods for each day of the week using start and end input fields. A tape modification field 412 specifies how the data set of the virtual tape volume is to be modified, e.g. compression, encryption, and deduplication. Further, specific compression, encryption, and deduplication technologies may be specified. When "Compressed" is specified, for example, all migrations will compress the target virtual tape volume during the migration. When "Uncompressed" is specified, all target virtual tape volumes will be written without compression during the migration. Any number of virtual tape engines can be associated with a migration policy, e.g. as specified after the descriptive name 400. A max tasks field 414 specifies the maximum number of virtual tape volumes that will be concurrently migrated under the configuration policy on each of the specified virtual tape engines. Specifying a larger number may ensure that more virtual tape volumes are moved in a shorter time, but the virtual tape engines will expend more resources doing so and thus performance may be degraded.

Figure 5:
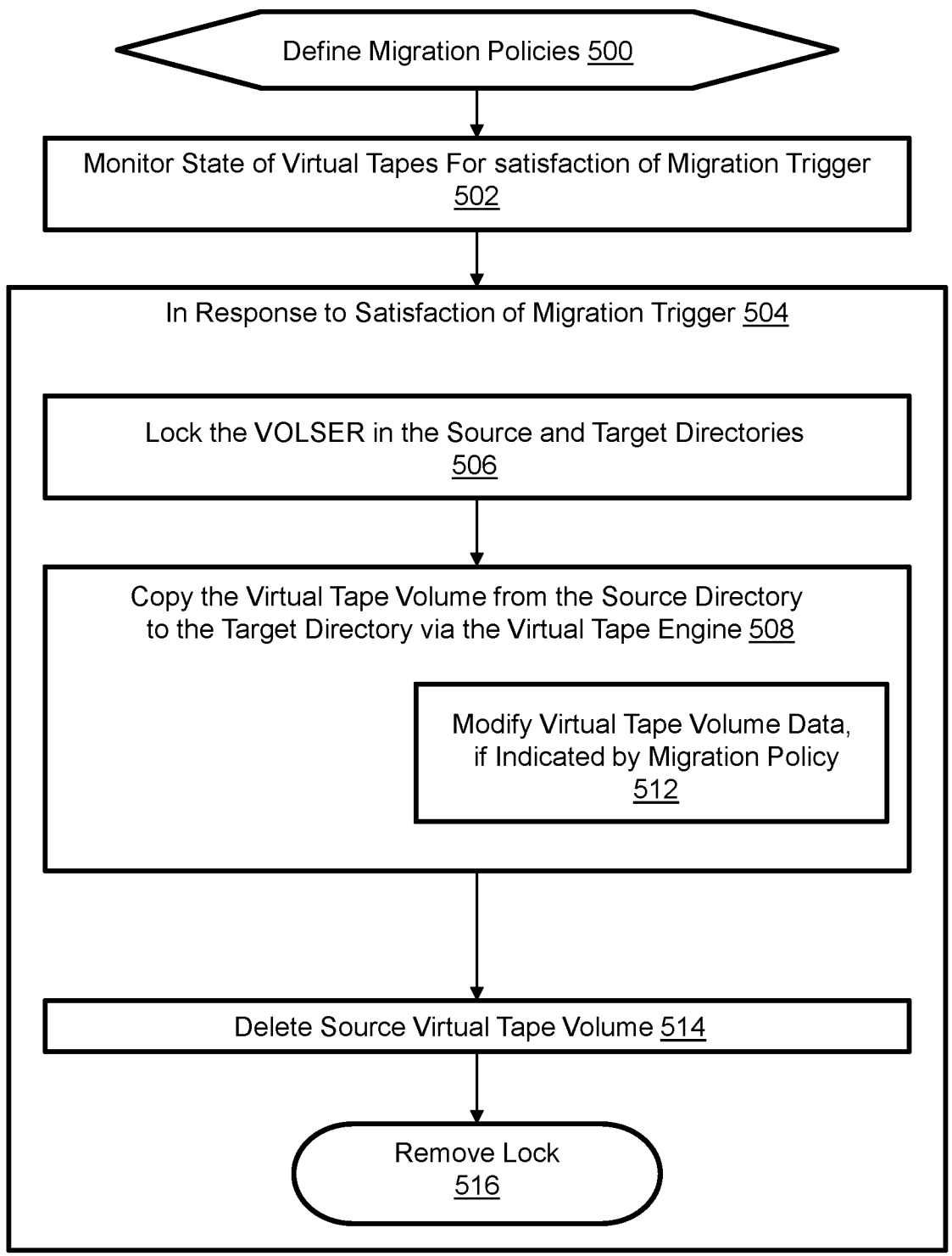
FIG. 5 illustrates a method of migrating a virtual tape volume between filesystems.

FIG. 5 illustrates a method of migrating a virtual tape volume between filesystems. Migration policies are defined beforehand as indicated at 500. As described above, configuration policies enable various migration parameters to be defined. For example, the "source" and "destination" filesystems, which virtual tape volumes to migrate, e.g., based on age and/or size, when to perform the migrations, and any data conversions to be performed during the migration. The state of virtual tape volumes is monitored for satisfaction of migration trigger conditions as indicated at 502. For example, if the non-accessed age of the virtual tape volume corresponds to the "move after" age of the migration policy associated with the virtual tape volume, and the move/do not move during field specifies a time that prompts or does not prohibit migration, then migration may commence.

Steps occurring in response to detection of satisfaction of migration trigger conditions are shown in block 504. As indicated in block 506, the VOLSER in the specified source directory and target directory is locked. As indicated in block 508, the virtual tape volume is copied from the source directory to the target directory via the virtual tape engine. The directories may correspond to individual virtual tape libraries. A pair of internal virtual tape drives are established, one to read the source virtual tape volume, and one to write the target virtual tape volume to storage. The source and target storage may be the same directory in the storage array, different directories in the storage array, different LUNs in the storage array, different storage arrays, or different types of storage, e.g. from the storage array as source to cloud storage as target. This technique allows the migration engine to optionally modify the form of data set as indicated in block 512. As already mentioned, modifying the form of the data set may include changing encryption, compression, and deduplication state. The source virtual tape volume is deleted after the target virtual tape volume has been generated as indicated in block 514. The lock is then removed as indicated at block 516. No resources of the mainframe host computer are required to implement the illustrated virtual tape volume migration steps.

Those of ordinary skill in the art will understand that migrating a virtual tape volume between different filesystems without using resources of the mainframe host computer is advantageous. Further, the source virtual tape volume may advantageously remain accessible during migration so the migration is non-disruptive. A variety of "use cases" may be supported. For example, migration may be performed before upgrading the virtual tape engine, migrating virtual tape volumes to cloud storage, or to reclaim LUN-associated storage space.

Several different features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:
1. An apparatus comprising:
a virtual tape engine comprising:
    a plurality of compute nodes each comprising non-transitory memory and at least one processor;
    a mainframe host computer interface adapted to receive tape drive utility access commands from a mainframe host computer;
    a storage array interface adapted to send input-output commands to a storage array and receive data from the storage array; and
    a migration engine that:
        sends input-output commands to the storage array to read a first data set from a source virtual tape volume that is a logical storage device presented by the storage array and where the first data set is logically stored, wherein the source virtual tape volume is associated with a source filesystem that is a data structure that describes how the first data set is logically stored on the source virtual tape volume; and
        sends input-output commands to the storage array to write the first data set back to a target virtual tape volume presented by the storage array wherein the target virtual tape volume is a logical storage device corresponding to the source virtual tape volume, wherein the target virtual tape volume is associated with a target filesystem that is different than the source filesystem and the target filesystem is a data structure that describes how the first data set is logically stored on the target virtual tape volume;
        wherein the first data set is stored on managed drives of the storage array and the storage array creates metadata that maps between the managed drives and the source virtual tape volume and the target virtual tape volume;
    whereby the first virtual tape volume is migrated between different filesystems of at least one virtual tape library on the storage array without loading the data set on the mainframe host computer and without moving the data set to a different storage array.
2. The apparatus of claim 1 wherein a data set associated with the source virtual tape volume is characterized by a form and the migration engine modifies the form of the data set to generate the target virtual tape volume.

3. The apparatus of claim 2 wherein the migration engine modifies the form of the data set by changing compression state.

4. The apparatus of claim 2 wherein the migration engine modifies the form of the data set by changing encryption state.

5. The apparatus of claim 1 wherein the source virtual tape volume is in a source directory, and the migration engine locks virtual tape volume serial numbers in the source directory.

6. The apparatus of claim 1 wherein the target virtual tape volume is in a target directory, and the migration engine locks virtual tape volume serial numbers in the target directory.

7. The apparatus of claim 1 wherein the migration engine sends a third input-output command to the storage array to delete the source virtual tape volume.

8. The apparatus of claim 1 comprising a migration policy that defines at least one of the following attributes: a source directory from which virtual tape volumes will be migrated; a target directory to which virtual tape volumes will be migrated; a move after field that indicates an age at which virtual tape volumes become eligible to be migrated; a field indicating when migration should and/or should not be performed; a tape modification field that indicates how a data set of the virtual tape volume is to be modified; and a max tasks field that indicates a maximum number of virtual tape volumes that will be concurrently migrated.

9. The apparatus of claim 8 wherein the migration engine automatically triggers migration of the source virtual tape volume based on the migration policy.

10. The apparatus of claim 1 wherein the virtual tape engine provides the mainframe host computer with access to the source virtual tape volume during migration.

11. A method comprising:
with a virtual tape engine comprising a plurality of compute nodes each comprising non-transitory memory and at least one processor, a mainframe host computer interface adapted to receive tape drive utility access commands from a mainframe host computer, a storage array interface adapted to send input-output commands to a storage array and receive data from the storage array, and a migration engine:
sending input-output commands to the storage array to read a first data set from a source virtual tape volume that is a logical storage device presented by the storage array and where the first data set is logically stored, wherein the source virtual tape volume is associated with a source filesystem that is a data structure that describes how the first data set is logically stored on the source virtual tape volume; and
sending input-output commands to the storage array to write the first data set back to a target virtual tape volume presented by the storage array wherein the target virtual tape volume is a logical storage device corresponding to the source virtual tape volume, wherein the target virtual tape volume is associated with a target filesystem that is different than the source filesystem and the target filesystem is a data structure that describes how the first data set is logically stored on the target virtual tape volume;
wherein the first data set is stored on managed drives of the storage array and the storage array creates metadata that maps between the managed drives and the source virtual tape volume and the target virtual tape volume;
whereby the first virtual tape volume is migrated between different filesystems of at least one virtual tape library on the storage array without loading the data set on the mainframe host computer and without moving the data set to a different storage array.

12. The method of claim 11 wherein a data set associated with the source virtual tape volume is characterized by a form and comprising the migration engine modifying the form of the data set to generate the target virtual tape volume.

13. The method of claim 12 comprising the migration engine modifying the form of the data set by changing compression state.

14. The method of claim 12 comprising the migration engine modifying the form of the data set by changing encryption state.

15. The method of claim 11 wherein the source virtual tape volume is in a source directory, and comprising the migration engine locking virtual tape volume serial numbers in the source directory.

16. The method of claim 11 wherein the target virtual tape volume is in a target directory, and comprising the migration engine locking virtual tape volume serial numbers in the target directory.

17. The method of claim 11 comprising the migration engine sending a third input-output command to the storage array to delete the source virtual tape volume.

18. The method of claim 11 comprising generating a migration policy that defines at least one of the following attributes: a source directory from which virtual tape volumes will be migrated; a target directory to which virtual tape volumes will be migrated; a move after field that indicates an age at which virtual tape volumes become eligible to be migrated; a field indicating when migration should and/or should not be performed; a tape modification field that indicates how a data set of the virtual tape volume is to be modified; and a max tasks field that indicates a maximum number of virtual tape volumes that will be concurrently migrated.

19. The method of claim 18 comprising the migration engine automatically triggering migration of the source virtual tape volume based on the migration policy.

20. The method of claim 11 comprising the virtual tape engine providing the mainframe host computer with access to the source virtual tape volume during migration.

* * * * *